US012774232B2

(12) United States Patent
Ostermeyer et al.

(10) Patent No.: US 12,774,232 B2
(45) Date of Patent: Oct. 27, 2026

(54) ENVIRONMENTAL-FRIENDLY PROCESS FOR THE TREATMENT OF WASTEWATER

(71) Applicants: UNIVERSITEIT GENT, Ghent (BE); UMICORE, Brussels (BE)

(72) Inventors: Pieter Ostermeyer, Ghent (BE); Korneel Rabaey, Ghent (BE); Tom Hennebel, Olen (BE)

(73) Assignees: UNIVERSITEIT GENT, Ghent (BE); UMICORE, Brussels (BE)

( * ) Notice: Subject to any disclaimer, the term of this patent is extended or adjusted under 35 U.S.C. 154(b) by 321 days.

(21) Appl. No.: 18/572,283

(22) PCT Filed: Jun. 10, 2022

(86) PCT No.: PCT/EP2022/065859
§ 371 (c)(1),
(2) Date: Dec. 20, 2023

(87) PCT Pub. No.: WO2022/268531
PCT Pub. Date: Dec. 29, 2022

(65) Prior Publication Data

US 2024/0294410 A1 Sep. 5, 2024

(30) Foreign Application Priority Data

Jun. 23, 2021 (EP) .................................... 21181218

(51) Int. Cl.

| | |
|---|---|
| ***C02F 3/00*** | (2023.01) |
| ***C02F 3/34*** | (2023.01) |
| *C02F 101/10* | (2006.01) |
| *C02F 103/10* | (2006.01) |
| *C02F 103/16* | (2006.01) |

(52) U.S. Cl.
CPC .............. *C02F 3/005* (2013.01); *C02F 3/345* (2013.01); *C02F 2101/101* (2013.01);
(Continued)

(58) Field of Classification Search
CPC .... C02F 3/005; C02F 3/345; C02F 2101/101; C02F 2103/10; C02F 2103/16;
(Continued)

(56) References Cited

U.S. PATENT DOCUMENTS

2011/0011799 A1* 1/2011 Rozendal .............. C02F 1/4693 210/203
2017/0305773 A1* 10/2017 Lupton ..................... C02F 3/10

FOREIGN PATENT DOCUMENTS

CN 107055947 A 8/2017
EP 0399993 A1 * 11/1990 ............... C25B 1/16
(Continued)

OTHER PUBLICATIONS

EP-0399993-B1_English translation (Year: 1990).*
(Continued)

*Primary Examiner* — Youngsul Jeong
(74) *Attorney, Agent, or Firm* — Rimon P.C.; Allyn B. Elliott

(57) ABSTRACT

Provided is a process for the environmental-friendly treatment of sulfate-containing wastewater. The acidic, sulfate-containing wastewater is treated in a sulfate reducing bioreactor with influent and effluent looped through to the cathode compartment of an electrochemical cell. The electrochemical cell stabilizes the pH in the bioreactor by the in-situ production of base in the cathode compartment. Additionally, hydrogen is produced which is used in the bioreactor as electron donor for the sulfate reduction. The middle compartment of the electrochemical cell contains a sulfide rich aqueous solution in which the extracted cations are displaced by protons from the anode compartment. This results in the acidification of the sulfide rich solution, which is beneficial for the extraction of sulfides as $H_2S$. This $H_2S$
(Continued)

can be used for the precipitation of metals in the beginning of the process, forming another loop.

7 Claims, 2 Drawing Sheets

(52) U.S. Cl.
CPC ...... *C02F 2103/10* (2013.01); *C02F 2103/16* (2013.01); *C02F 2201/46115* (2013.01); *C02F 2201/46185* (2013.01); *C02F 2209/06* (2013.01); *C02F 2301/043* (2013.01); *C02F 2301/046* (2013.01)

(58) Field of Classification Search
CPC ............ C02F 2201/46115; C02F 2201/46185; C02F 2209/06; C02F 2301/043; C02F 2301/046; Y02W 10/10
See application file for complete search history.

(56) References Cited

FOREIGN PATENT DOCUMENTS

| | | | | |
|---|---|---|---|---|
| EP | 0880475 A1 | | 12/1998 | |
| WO | WO-9729055 A1 | * | 8/1997 | ................ C02F 3/30 |
| WO | WO-2014037276 A2 | * | 3/2014 | ......... B01D 24/4689 |
| WO | 2020033988 A1 | | 2/2020 | |

OTHER PUBLICATIONS

WO-2014037276-A2_English translation (Year: 2014).*
CNPO: Notification of First Office Action for Chinese Patent Application No. 202280044167.0, mailed Aug. 14, 2024, 6 pages.
ISA/EP; International Search Report and Written Opinion for International Patent Application No. PCT/EP2022/065859 dated Sep. 8, 2022, 11 pages.

* cited by examiner

ENVIRONMENTAL-FRIENDLY PROCESS FOR THE TREATMENT OF WASTEWATER

CROSS REFERENCE TO RELATED APPLICATIONS

This application is a U.S. National Stage Application of International Patent Application No. PCT/EP2022/065859 filed on Jun. 10, 2022, which claims priority to European Patent Application No. EP 21181218.5, filed on Jun. 23, 2021.

The present invention relates to a process for the treatment of wastewater, in particular metallurgical and mining wastewater. Such wastewaters are usually acidic, sulfate-rich, have a pH below 5 and contain a variety of metals and metalloids.

Historically, wastewaters have been treated by adding CaO or $Ca(OH)_2$ (lime) to the wastewater, resulting in their alkalization, the removal of sulfates by precipitation as $CaSO_4 \cdot 2H_2O$ (gypsum), and the precipitation of metals as metal hydroxides, or, in the case of arsenic, as $Ca_3(AsO_4)_2$. See Nazari et al., Hydrometallurgy. 174, 258-281, 2017.

In addition to the high consumable costs of using lime, high volumes of metal-polluted gypsum needed to be disposed of, as it is unsuitable for reuse. Moreover, valuable metals and other potentially useful compounds are lost, as their recovery from this precipitate is difficult. Looking even closer at the environmental aspects of this process, lime treatment and metal hydroxide precipitation are increasingly insufficient to meet future stringent environmental standards. See Johnson et al., Sci. Total Environ. 338, 3-14, 2005.

Sulfate reducing bioreactors have been proposed as an alternative for the treatment of sulfate- and metal-bearing wastewater in e.g. WO2018007297, EP0880475 and EP1578697. In those, bacteria reduce sulfates to sulfides. The sulfides can subsequently be used to precipitate metals or metalloids. However, sulfate reducing bioreactors are dependent on the addition of an external electron donor, such as hydrogen gas or an organic compound, as well as acids and bases for pH control. In case of sulfate-rich, acidic wastewater and $CO_2$ as a carbon source, additional alkali is required to maintain a circumneutral pH in the bioreactor.

The use of consumables is not only adding up to the operational costs, but in an industrial setup also implies off-site production, purchase, on-site storage, process control, and safety measures associated with these chemicals. Looking again at environmental aspects of such processes, the addition of alkali increases the salinity and conductivity of the wastewater, which may be problematic when intended for discharge into freshwater environments or on-site reuse.

WO2010002503 describes the use of an electro-biochemical reactor for the reduction of target compounds such as arsenic, selenium, mercury or nitrates, to meet drinking water and discharge criteria. In this system, electrodes are directly inserted in the reactor, which serve as electron donor for the microorganisms.

Just as WO2010002503, electro-biochemical systems proposed in Blàzquez et al. Water Research, 105, 395-405, 2016, or in Luo et al. Bioresource Technology 167, 462-468, 2014, are limited by the slow rate of electron transfer and limited density of microorganisms. Due to the low achieved current density and reduction rates (less than 5 g sulfate per day per liter bioreactor), these technologies require excessively large reactors and many electrodes, resulting in high capital expenditures to treat sulfate-rich metallurgical wastewater.

It has thus not yet been demonstrated for electro-biochemical systems in general that they are capable of treating high flowrates of sulfate-rich metallurgical wastewaters, while using a reasonably sized reactor.

DETAILED DESCRIPTION OF THE INVENTION

The present divulgation provides a process, centered around a bioreactor, allowing for a high specific reactor reduction rate, while also avoiding the use of reagents such as alkali. This result is achieved by combining a bioreactor with an external electrochemical cell. This combination is remarkably beneficial, as the cathode compartment of the electrochemical cell generates $H_2$, which is a suitable electron donor for the microorganisms, together with hydroxyl anions allowing to achieve the pH-control of the bioreactor. No further addition of consumables is needed to ensure an optimal pH in the bioreactor.

Figure 1:
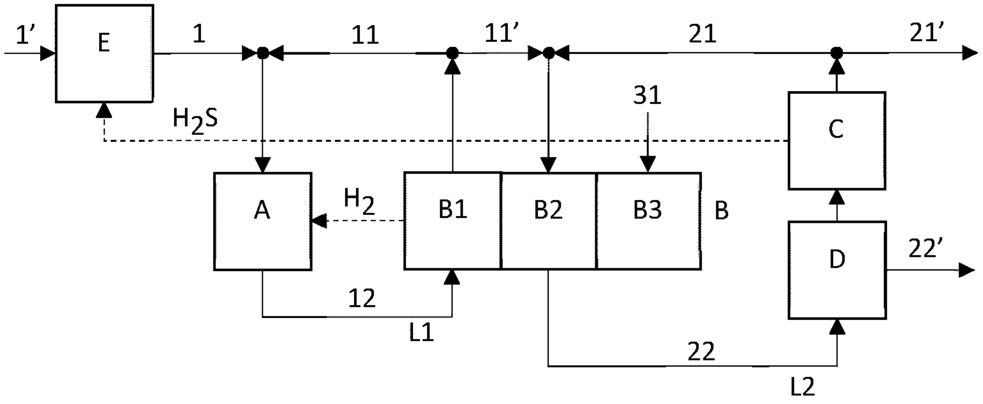
FIG. 1 is a block diagram of the flow sheet.

FIG. 1 shows a block diagram of the flow sheet, wherein:

A: Bioreactor;

B: Electrochemical cell, with B1: Cathode; B2: Central compartment; B3: Anode;

C: Stripping reactor (optional);

D: Water removal reactor (optional); and,

E: Sulfide precipitation reactor (optional).

Stream 1 is the wastewater feed to the process. Wastewater may optionally be fed as stream 1' and subjected to a prior sulfide precipitation. Streams 11 and 12 form a first recirculating loop L1. Bleeding stream 11' is the output stream, which is preferably feeding a second recirculating loop L2, which is formed by streams 21 and 22. Bleed stream 21' then becomes the preferred output stream. Stream 22' is essentially water from the water removal reactor.

When the optional steps using a stripping reactor (C) or using a water removal reactor (D) are not performed, the recirculating loop (L2) is closed by bypassing any missing reactor.

Stream 31 is an acidic aqueous solution fed to the anode compartment (B3) of the electrochemical cell (B). Once in operation, only water needs to be added to compensate for its electrolysis, whereby protons migrate to the central compartment, and oxygen evolves as a gas.

The synergy of the combination of bioreactor and electrochemical cell is demonstrated in the following embodiments.

Figure 2:
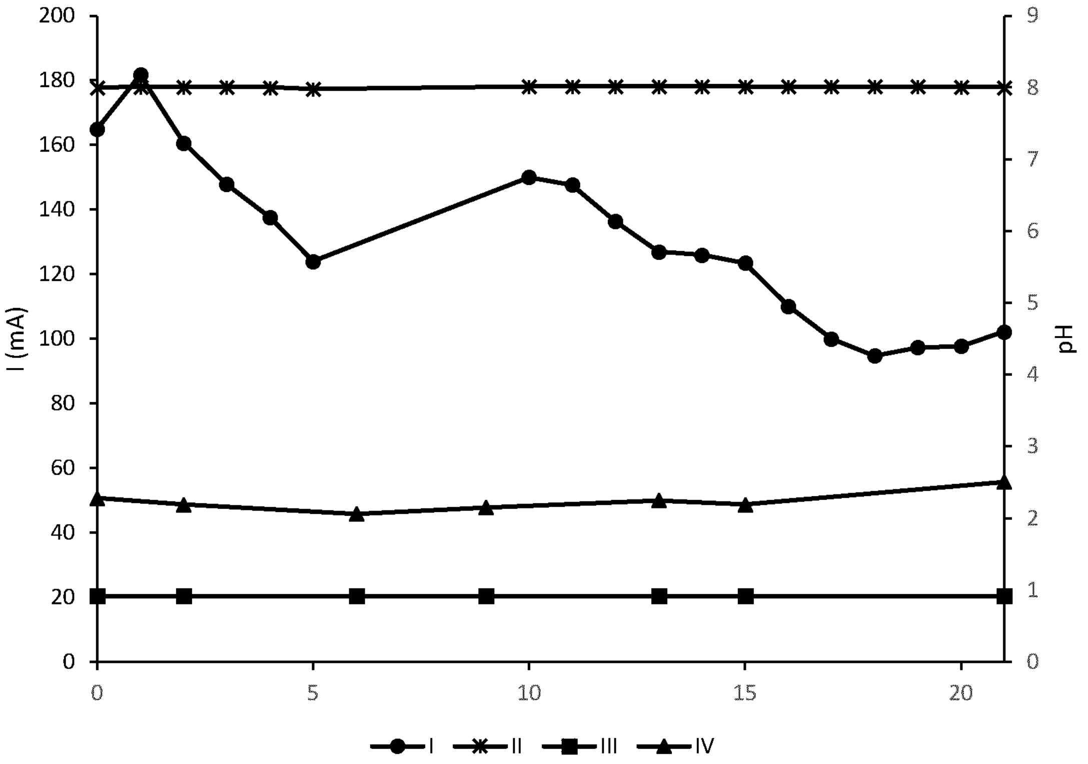
FIG. 2 is a graph that is related to the dynamics of the process illustrated in Example 1, showing the evolution of important process parameters.

FIG. 2 is related to the dynamics of the process illustrated in Example 1, showing the evolution of important process parameters:

I: Current in mA through the electrochemical cell (B);

II: pH in the first recirculating loop (streams 11, 12, 11'), respectively in the bioreactor (A);

III: pH of the wastewater or process feed (stream 1); and,

IV: pH in the second recirculating loop or process output (streams 21, 22, 21').

A first embodiment relates to a process for the treatment of wastewater (1) containing sulfate salts of cations susceptible of forming soluble sulfides, comprising the steps of:

providing a bioreactor (A) suitable for the reduction of sulfates to sulfides;

providing an electrochemical cell (B) through which a current is passed, having a central compartment (B2) connected by cation exchange membranes to an adjacent cathode compartment (B1), and to an adjacent anode compartment (B3), thereby generating $H_2$ in the cathode compartment, and $O_2$ in the anode compartment;

passing a cation-bearing aqueous solution (21) through the central compartment (B2);

providing an acidic aqueous solution (31) in the anode compartment (B3);

circulating a sulfidic solution (11, 12) in a first loop (L1) over a path passing through the bioreactor (A) and the cathode compartment (B1), whereby the pH of the solution is maintained between 6 and 9 by adjusting the current through the electrochemical cell (B);

adding the wastewater (1) to the first loop at a set flow rate; and, bleeding a minor part (11') of the solution from the first loop (L1) at a rate corresponding to the flow rate of feeding the wastewater (1).

Cations susceptible of forming soluble sulfides are e.g. those from the list comprising $Na^+$, $K^+$, $Ca^{2+}$, $Mg^{2+}$, and $NH_4^+$.

The use of a bioreactor in this context implies that an electron donor and a carbon source are provided, along with the selection of a suitable pH and temperature. Such conditions depend upon the precise choice of microorganisms, according to the general knowledge of the skilled person. A pH between 6 and 9 is generally appropriate, a pH between 7.5 and 8.5 is preferred, as is a temperature around normal room temperature.

The electrochemical cell (B) comprises a cathode compartment (B1), a central compartment (B2) and an anode compartment (B3); adjacent compartments are connected by cation exchange membranes. The anode compartment (B3) contains an acidic aqueous solution. $O_2$ and $H^+$ are generated, at a rate according to the current passing through the cell. The $O_2$ may be recovered for other uses.

Due to the electrical current through the electrochemical cell (B), $H^+$ migrates from the anode compartment (B3) to the central compartment (B2) through a first cation exchange membrane. The central compartment (B2) is hereby acidified. Concurrently, soluble cations migrate from the central compartment (B2) to the cathode compartment (B1) through a second cation exchange membrane. The cathode compartment (B1), which contains recirculating sulfidic solution of the bioreactor (A), is hereby basified.

The basification is useful to compensate for the generally acidifying reactions taking place in the bioreactor (A). This is a key feature of the invention: the pH of the bioreactor, which tends to acidify, is controlled through the modulation of the current through the electrochemical cell (B). There is therefore no need for adding reagents such as NaOH, as is conventionally done. This feature therefore reduces the amount of salts to be discharged.

The presence of cations susceptible of forming soluble sulfides is necessary for this basification mechanism to be effective. In absence of such cations, only $H^+$ would migrate from the central compartment (B2) to the cathode compartment (B1) through the second cation exchange membrane. This would not have the desired effect of basification of the recirculating sulfidic solution. Therefore, the expression "cation-bearing aqueous solution" refers to aqueous solutions containing at least a minimal concentration of above-mentioned cations susceptible of forming soluble sulfides to ensure proper working conditions. Pure water or pure acid, not containing any of those cations, would not have the same effect. The minimal concentration of cations susceptible of forming soluble sulfides depends on the pH and the sulfate concentration of the wastewater, the achieved reduction rate of the bioreactor, and the amount of $CO_2$ added to the system as carbon source. To determine the required amount of cations experimentally, the wastewater can be tested in a lab-scale version of the treatment plant. A concentration of 20 mmol/L or more is preferred.

One advantage of the described first loop (L1) is that the wastewater (1) can, in principle, be added anywhere in the loop. Similarly, the bleeding (11') can be extracted anywhere in the loop, making the system very flexible. This works because a relatively high recirculation ratio of typically more than 10 is used, resulting in a composition that is essentially constant throughout the loop (L1). In a continuous process, the sulfidic solution in the first loop (L1) also contains a limited concentration of sulfates, originating from the wastewater (1). Bleed (11') should be commensurate with the inflow of wastewater (1) to avoid accumulation of solution in the first loop.

A second embodiment relates to a process according to the previous one, comprising the additional steps of:

circulating a cation-bearing aqueous solution (21, 22) in a second loop (L2) over a path passing through the central compartment (B2);

adding the bleed (11') from the first loop to the second loop; and, bleeding a minor part (21') of the solution from the second loop (L2) at a rate corresponding to the flow rate of feeding the wastewater (1).

For the same reasons as for the first loop (L1), mentioned above, in- and output of the second loop (L2) can be anywhere in the loop. Bleed (21') should be commensurate with the inflow of bleed (11'), and thus with the inflow of wastewater (1) to avoid accumulation of solution in the second loop (L2). The first loop (L1), which is fed by wastewater (1), is assumed to contain cations having soluble sulfides. The second loop (L2), which is fed through bleed (11'), contains the same cations, and can therefore be described as a "cation-bearing aqueous solution".

When the optional stripping reactor (C) and water removal reactor (D) are absent, the recirculating loop (L2) is closed by connecting stream (22) directly to stream (21).

A third embodiment according to any of the previous embodiments relates to a process comprising the step of inserting a stripping reactor (C) in the second loop (L2), for the recovery of $H_2S$.

As the aqueous solution in the second loop (L2) contains sulfides as $H_2S$, it may be appropriate to strip this solution, thereby obtaining a sulfide-depleted output (21') and $H_2S$. In this case, the acidification in the central compartment (B2) of the electrochemical cell is beneficial, as it facilitates the stripping process. Apart from acidification, the stripping process can also benefit from an elevated temperature. A pH of less than 6 is preferred; a temperature of more than 40° C. is preferred.

Another embodiment according to any of the previous embodiments relates to a process comprising the step of inserting a water removal reactor (D) in the second loop (L2).

The advantage of a water-removal step is that the salinity of the second loop can be increased. The concentration of cations can be increased by combining the proposed treatment with membrane treatment such as ultrafiltration, nanofiltration or reverse osmosis. The brine or retentate from this treatment contains elevated concentrations of cations. This allows to also process wastewater streams with less salts of cations susceptible of forming soluble sulfides.

With the inclusion of a water removal reactor (D), low-salinity stream (22') extracts a major part of the water entering the system together with a minor part of the salts, while high-salinity bleed (21') extracts a major part of the salts entering the system and a minor part of the water. Streams (21') and (22') should both be commensurate with the salt and water in the inflow of wastewater (1). Respecting the mass balance of water and salt will avoid the accumulation of either in the second loop (L2).

Again, both stripping reactor (C) and water removal reactor (D) could be positioned anywhere in the second loop (L2), making the system very flexible.

Alternatively, the water removal reactor (D) could be positioned in-line with bleed (21'), outside of the second loop (L2). The output streams would then comprise separated solutions with respectively a high and a low salinity.

Another embodiment according to any of the previous, relates to a process comprising the step of sparging the $H_2$ generated in the cathode compartment (B1) into the first loop (L1). It is preferred to sparge the $H_2$ directly into the bioreactor (A).

Wastewaters often contain elements susceptible of forming insoluble sulfides, such as e.g. those from the list comprising Cu, Ni, Fe, As and Hg. Such wastewaters then can usefully be subjected to a preliminary purification by contacting them with sulfides, and in particular with $H_2S$.

Therefore, another embodiment relates to a process for the treatment of wastewater (1') containing sulfate salts of cations susceptible of forming soluble and insoluble sulfides, comprising the steps of:

- providing a sulfide precipitation reactor (E);
- feeding the wastewater (1') to the sulfide precipitation reactor (E);
- feeding $H_2S$ to the sulfide precipitation reactor, thereby precipitating the insoluble sulfides;
- separating the insoluble sulfides from the wastewater, thereby obtaining wastewater (1); and,
- processing said wastewater (1) according to any of the previous embodiments.

It is even more advantageous, if this $H_2S$ completely or partially originates from the stripping process in the stripping reactor (C), recirculated and thus efficiently used in the precipitation reactor (E).

Therefore, another embodiment relates to a process for the treatment of wastewater (1') containing sulfate salts of cations susceptible of forming soluble and insoluble sulfides, with the proviso that stripping reactor (C) is provided, comprising the steps of:

- providing a sulfide precipitation reactor (E);
- feeding the wastewater (1') to the sulfide precipitation reactor (E);
- feeding $H_2S$ recovered from stripping reactor (C) to the sulfide precipitation reactor, thereby precipitating the insoluble sulfides;
- separating the insoluble sulfides from the wastewater, thereby obtaining wastewater (1); and,
- processing said wastewater (1) according to any one of the previous embodiments.

In another embodiment, surplus $H_2S$ gas (i.e. $H_2S$ that was not involved in precipitating insoluble sulfides), is sent back from the precipitation reactor (E) to the stripping reactor (C), optionally closing the gas loop. By closing the gas loop $H_2S$ is optimally used for precipitating metals in the precipitation reactor (E). Advantageously, this also reduces the amount of $H_2S$ for which a post treatment is needed when leaving the system at the end of the process.

While it is also possible to precipitate cations susceptible of forming insoluble sulfides in a bioreactor itself, it is a preferred option to do this precipitation in a separated sulfide precipitation reactor (E). This way, pollution of the bioreactor is avoided, which is presumably beneficial for the bacteria and reduces the need for cleaning and maintenance of the bioreactor.

Alternatively to stripping sulfides as $H_2S$, surplus sulfides can be recovered through oxidation to elemental sulfur or precipitation by addition of iron chloride. The resulting elemental sulfur or sulfur-containing compounds such as iron sulfide can also be recovered and valorized.

A bioreactor requires both a carbon source, and an electron donor. $CO_2$ and $H_2$ are typical examples fulfilling these roles. They could be replaced by well-known alternative products.

The pH in the bioreactor (A) needs to be controlled. The pH is measured and compared to a setpoint, the error being used to modify the current through the electrochemical cell (B). A too low pH can be corrected by increasing the current, and vice versa.

The pH control by modulating the current through the electrochemical cell (B) is a key feature of the present invention. The incoming wastewater is typically very acidic, and the bioreactor (A) operates around pH 8. Continuous basification is therefore needed.

The wastewater liberates protons during basification according to:

$$HSO_4^- \rightarrow SO_4^{2-} + H^+$$

(pKa = 1.99)

The $CO_2$ added for growing the bacteria also liberates protons according to:

$$CO_2 + H_2O \rightarrow HCO_3^- + H^+$$

(pKa = 6.3)

The sulfate reducing activity consumes protons according to:

$$4\,H_2 + SO_4^{2-} + H^+ \rightarrow HS^- + 4\,H_2O$$

In typical cases, more protons are released than consumed. The solution needs therefore to be actively basified to reach the operational pH of about 8 in the bioreactor (A). This is achieved by the electrochemical cell (B), according to the reactions:

$$2\,H_2O - 4\,e^- \rightarrow O_2 + 4\,H^+$$

(anode)

$$H_2O + 2\,H^+ + 2\,e^- \rightarrow H_2 + 2\,OH^-$$

(cathode)

Due to the electric current through the electrochemical cell (B), protons migrate from the anode compartment (B3)

to the central compartment (B2) through the membrane. Likewise, soluble cations, such as $Na^+$, migrate from the central compartment (B2) to the cathode compartment (B1) through the membrane. The cathode gets enriched in soluble hydroxides, which become available to basify the recirculating bioreactor loop (L1). No external reagents are needed.

The following examples further illustrate the invention.

EXAMPLE 1

A synthetic wastewater medium is prepared by adding 85 mL of 98% $H_2SO_4$ (Sigma-Aldrich), 183 mg KCl (>99.5%, Carl-Roth), 74 mg $NH_4Cl$ (>99.7%, Carl-Roth), 33 mg $MgCl_2 \cdot 6H_2O$ (>99%, Carl-Roth) and 37 mg $CaCl_2 \cdot 2H_2O$ (>99%, Carl-Roth) to 10 L demineralized water, so as to reach the composition according to Table 1. Phosphate is added to the synthetic wastewater medium diluting 0.21 mL of $H_3PO_4$ (85%, Sigma-Aldrich) in 10 L of wastewater. Trace elements and vitamins are prepared and added according to DSMZ 141, as used for methanogenic media [DSMZ GmbH, DSMZ 141 Methanogenium medium ($H_2/CO_2$), (2017)]. Prior to use, the wastewater medium was stored at 4° C. and sparged 30 minutes with $N_2$. The pH of 0.92 is reached by addition of NaOH pellets (VWR).

The bioreactor is inoculated with a mixture of sulfate reducers (*Desulfovibrio* spp., *Desulfomicrobium* spp.), and fermenters (*Soehngenia* spp., *Lentimicrobium* spp.). This inoculum can be obtained from suppliers of microbial strains such as the American Type Culture Collection (ATCC), the Leibniz Institute DSMZ or the Belgian coordinated collections of micro-organisms (BCCM).

The exact ratio of sulfate reducers to fermenters is not critical, and allows for a wide margin, depending on the system. For example, if the electron donor is changed from $H_2$ to molasses, a higher sulfate reducers to fermenters ratio may be preferred, such as 50:50. In the present example, a sulfate reducers to fermenters ratio of 80:20 is used.

The set-up is construed according to the scheme shown in FIG. 1, without the optional sulfide stripping reactor (C), dewatering unit (D) and precipitation reactor (E). The wastewater is pumped and treated in a sulfate reducing bioreactor (A) at a wastewater flow rate of 365 mL/day via a Watson-Marlow 300 pump. Gas bags filled with $N_2$ are connected to 10 L wastewater bottles to maintain anaerobic conditions. An up-flow expanded bed bioreactor is used for hydrogenotrophic sulfate reduction. The bioreactor consists of a glass column of 50 mm diameter and 60 cm height. The bioreactor is filled with 53 g (dry weight) or 250 mL of granular activated carbon (CalgonCarbon Carbsorb™ 30) as biocarrier. An up-flow of 280 mL/h is provided, resulting in an expanded bed volume of 250 mL. Sampling ports are present in the bioreactor for sampling of the activated carbon, gas phase and effluent.

Hydrogen gas is provided to the bioreactor as electron donor, generated via electrolysis using a separate electrochemical cell or directly from a gas cylinder. The pH is measured with a sulfide resistant probe (HA405-DXK-S8/120, Mettler-Toledo) and is controlled using a PID loop acting on the current of the electrochemical cell.

A three-compartment electrochemical cell (B) is used to maintain a stable reactor pH of 8±0.15. A stainless-steel mesh (100 $cm^2$) is used as a cathode while an iridium mixed-metal oxide titanium-based (Ti) electrode (Ir MMO) (Magneto Special Anodes) is used as an anode. Cathode and anode compartment are separated by cation exchange membranes (CEM, Membrane International Ultrex CMI-7000). A power source (TDK-Lambda Z-20-30) is used to power the electrochemical cell (B), controlled by the PID loop. The pH of the bioreactor (A), applied potential and current are registered every 4 s. Bioreactor liquid, corresponding to sulfidic solution (12) from the first loop (L1), is recirculated over the cathode compartment (B1). When the pH of the bioreactor (A) drops below pH 7.85, the PID loop increases the applied current, while the current is lowered when a pH of 8.15 was reached. The reactor is kept at room temperature, between 15 and 25° C.

The bioreactor effluent, corresponding to bleed (11') from the first loop (L1), is rich in sulfides and depleted in sulfate. It is collected in a 1 L multi-neck Schott bottle. The bioreactor effluent is recirculated from the 1 L bottle over the central compartment (B2) of the electrochemical cell (B). Cations are extracted from this central compartment (B2) via the cathode compartment (B1) back into the bioreactor (A). These cations are replaced by protons produced in the anode compartment (B3). This acidified sulfate-depleted water, supports degassing of sulfides, optionally in a stripping reactor (C). The anolyte contains 0.25 M $H_2SO_4$ (B3). Oxygen produced at the anode is vented into the atmosphere. After acidification and cation extraction, the effluent is collected in a plastic 10 L vessel.

Table 1 shows the composition, pH and conductivity of the treated water at different stages of the treatment. Sulfate is removed in the bioreactor (A) from 15.6 g/L $SO_4^{2-}$ to 0.2 g/L $SO_4^{2-}$, corresponding to a sulfate reduction rate of 22.5 g sulfate per liter per day. This reduction rate is higher than those achieved by current electro-biochemical systems and conventional sulfate reducing bioreactors already applied at industrial scale. The reduced sulfate is converted into ca. 3 g/L of dissolved sulfides (DS). The mass balance of sulfur does not fully close, which may be explained by the instability of sulfides and difficulty to measure sulfides, as these compounds are easily oxidized when in contact with air or other oxidants. Due to the extraction of cations, the conductivity decreases from 9 to 4 mS/cm. The conductivity of the feed (1) is high (114 mS/cm) due to the low pH and conductivity of $H^+$

TABLE 1

Process stream characteristics

| | pH | Conductivity (mS/cm) | $Cl^-$ (mg/L) | $PO_4^{3-}$ (mg/L) | $SO_4^{2-}$ (mg/L) | Dissolved sulfides (mg/L) |
|---|---|---|---|---|---|---|
| Stream (1) Wastewater | 0.92 | 114 | 526 | 481 | 15518 | 0 |
| Loop 1 Bioreactor | 8.01 | 9 | 405 | 305 | 244 | 3040 |
| Stream (21') Output | 2.23 | 4 | 422 | 335 | 194 | 1200 |

TABLE 1-continued

| Process stream characteristics | | | | | | |
|---|---|---|---|---|---|---|
| | $Na^+$ (mg/L) | $NH_4^+$ (mg/L) | $K^+$ (mg/L) | $Ca^{2+}$ (mg/L) | $Mg^{2+}$ (mg/L) | Total cations* (mmol/L) |
| Stream (1) Wastewater | 164 | 25 | 96 | 10 | 4 | 12 |
| Loop 1 Bioreactor | 1623 | 251 | 909 | 66 | 36 | 114 |
| Stream (21') Output | 288 | 46 | 139 | 6 | 4 | 19 |

*Total cations = $[Na^+] + [K^+] + [NH_4^+] + 2 \times [Mg^{2+}] + 2 \times [Ca^{2+}]$ The working principle of the technology can be observed in Table 1 and FIG. 2. Na, $NH_4$, K, and Mg concentrations (i.e. essentially the total cation concentration) are elevated in the bioreactor (A) compared to the concentrations in the feed (1) or in the output (21'). This shows that the electrochemical cell (B) is effective in extracting cations from the central compartment (B2) of the electrochemical cell to the cathode compartment (B1) and further to the bioreactor (A) for the in-situ production of alkali such as NaOH, KOH, $NH_4(OH)$, $Ca(OH)_2$ and $Mg(OH)_2$, which are required for neutralization of acidic wastewater and $CO_2$. This results in an increase of the pH from 0.92 to 8.01, which is maintained in a stable manner throughout the experiment (see FIG. 2). The cations, extracted from the central compartment (B2) of the electrochemical cell (B), are replaced by protons from the anode compartment (B3), resulting in a decrease in pH from 8.01 to 2.23. It can be seen in FIG. 2 that the pH of central compartment (B2) and applied current varied over the course of the experiment. This can be explained by slight variations in sulfate reduction. When more sulfate is reduced, more protons are consumed, and more sulfides are produced. As a result, the need for additional alkali decreases and less current is required. Due to the lower current, less cations are replaced by $H^+$ in the central compartment (B2). Additionally, higher sulfide concentrations in the bioreactor bleed (11') also counteracts the pH drop in the central compartment (B2) as $H^+$ are consumed by the protonation of $HS^-$.

EXAMPLE 2

In this example, the set-up is expanded with the optional sulfide stripping reactor (C) and precipitation reactor (E), according to FIG. 1. The 1 L multi-neck Schott bottle is converted into a sulfide stripping reactor by sparging $N_2$ at a rate of 2 L/min using an ATEX KNF N922FTE 16L gas pump. After $H_2S$ stripping, the gas is sparged into a deaerated glass 10 L vessel containing the wastewater medium according to Example 1, spiked with 468 mg $NaAsO_2$, 70 mg $PbCl_2$, 41 mg $CdCl_2$, 24 mg $CuCl_2$, 2 mg $TlCl_2$, resulting in wastewater medium with As (272 mg/L), Pb (5.2 mg/L), Cd (2.502 mg/L), Cu (1.14 mg/L) and TI (0.152 mg/L). This wastewater medium is continuously mixed with a magnetic stirrer at 600 rpm.

After sparging, the gas is recirculated from the precipitation reactor (E) back to the stripping reactor (C), closing the gas loop.

All metals and metalloids are precipitated and removed down to concentrations below 0.2 mg/L. As, the metal(loid) with the highest initial concentration, is removed from 272 mg/L down to less than 0.05 mg/L. Cd is removed down to a concentration of 0.172 mg/L. All other metals and metalloids are below the limit of detection: Cu<0.004 mg/L, Pb<0.03 mg/L and Tl<0.02 mg/L. This shows the efficacy of using sulfides produced in the bioreactor (A) and stripped in the striping reactor (C) for the removal of metals and metalloids as sulfide precipitates in the precipitation reactor (E). This is most advantageous for elements such as Cu, which are toxic for the microorganisms and may hamper the functioning of the bioreactor (A), and elements such as As, which are soluble at the pH of the bioreactor (A) and may result in undesirable electrochemical reactions in the electrochemical cell (B).

The invention claimed is:

1. A process for treatment of wastewater containing sulfate salts of cations susceptible of forming soluble sulfides, comprising the steps of:

providing a bioreactor suitable for reduction of sulfates to sulfides;

providing an electrochemical cell through which a current is passed, having a central compartment connected by cation exchange membranes to an adjacent cathode compartment, and to an adjacent anode compartment, thereby generating $H_2$ in the cathode compartment, and $O_2$ in the anode compartment;

passing a cation-bearing aqueous solution through the central compartment;

providing an acidic aqueous solution in the anode compartment;

circulating a sulfidic solution in a first loop over a path passing through the bioreactor and the cathode compartment, whereby a pH of the sulfidic solution is maintained between 6 and 9 by adjusting the current through the electrochemical cell;

adding the wastewater to the first loop at a set flow rate; and bleeding a minor part of the solution from the first loop at a rate corresponding to a flow rate of adding the wastewater.

2. The process according to claim 1, comprising the additional steps of:

circulating a cation-bearing aqueous solution in a second loop over a path passing through the central compartment;

adding a bleed from the first loop to the second loop; and bleeding a minor part of the solution from the second loop at a rate corresponding to a flow rate of adding the wastewater.

3. The process according to claim 1, comprising the step of inserting a stripping reactor in the second loop, for the recovery of $H_2S$.

4. The process according to claim 1, comprising the step of inserting a water removal reactor in the second loop.

5. The process according to claim 1, comprising the step of sparging the $H_2$ generated in the cathode compartment into the first loop.

6. The process for treatment of wastewater containing sulfate salts of cations susceptible of forming soluble and insoluble sulfides, comprising the steps of:

providing a sulfide precipitation reactor;

feeding the wastewater containing sulfate salts of cations susceptible of forming soluble and insoluble sulfides to the sulfide precipitation reactor;

feeding $H_2S$ to the sulfide precipitation reactor, thereby precipitating the insoluble sulfides;

separating the insoluble sulfides from the wastewater containing sulfate salts of cations susceptible of forming soluble and insoluble sulfides, thereby obtaining wastewater depleted of sulfate salts of cations susceptible of forming soluble and insoluble sulfides; and processing said sulfate salt-depleted wastewater according to the process recited in claim 1.

7. A process for treatment of wastewater containing sulfate salts of cations susceptible of forming soluble and insoluble sulfides, with the proviso that the stripping reactor is provided according to claim 3, comprising the steps of:

providing a sulfide precipitation reactor;

feeding the wastewater containing sulfate salts of cations susceptible of forming soluble and insoluble sulfides to the sulfide precipitation reactor;

feeding $H_2S$ recovered from the stripping reactor to the sulfide precipitation reactor, thereby precipitating the insoluble sulfides;

separating the insoluble sulfides from the wastewater containing sulfate salts of cations susceptible of forming soluble and insoluble sulfides, thereby obtaining wastewater depleted of sulfate salts of cations susceptible of forming soluble and insoluble sulfides; and processing said sulfate salt-depleted wastewater according to the process recited in claim 3.

* * * * *